(12) United States Patent
Hong

(10) Patent No.: US 6,601,435 B2
(45) Date of Patent: Aug. 5, 2003

(54) METHOD AND DEVICE FOR ESTIMATING A FRICTION COEFFICIENT BETWEEN A TIRE AND A ROAD SURFACE

(75) Inventor: Jin-Ho Hong, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/126,012

(22) Filed: Apr. 19, 2002

(65) Prior Publication Data

US 2003/0051544 A1 Mar. 20, 2003

(30) Foreign Application Priority Data

Sep. 11, 2001 (KR) ........................................ 2001-55875

(51) Int. Cl.[7] .............................................. G01N 19/02
(52) U.S. Cl. ................................ 73/9; 701/80; 702/148
(58) Field of Search .................... 73/7–9; 702/145–148; 701/80

(56) References Cited

U.S. PATENT DOCUMENTS

| | | | | |
|---|---|---|---|---|
| 4,212,063 A | * | 7/1980 | Hardmark | ............... 701/70 |
| 5,198,982 A | * | 3/1993 | Kobayashi | ............... 180/197 |
| 6,266,600 B1 | * | 7/2001 | Miyazaki | ............... 303/150 |
| 6,427,519 B2 | * | 8/2002 | Ueda et al. | ............... 73/8 |

* cited by examiner

Primary Examiner—Hezron Willams
Assistant Examiner—Jermaine Jenkins
(74) Attorney, Agent, or Firm—Pennie & Edmonds LLP

(57) ABSTRACT

A method for estimating a friction coefficient between a tire of a vehicle and a road surface, which may be used in obtaining a safety distance for an adaptive vehicle, estimating the friction coefficient by using state variables that are measured by means of RPM sensors normally equipped on vehicles. A device for estimating a friction coefficient has a control section receiving signals from a braking/steering monitoring section and outputting the friction coefficient stored in a friction coefficient value storage when both or either of a braking action and a steering action are applied to the vehicle, and outputting the friction coefficient estimated by a friction coefficient estimator when the braking action and the steering action are not applied to the vehicle.

22 Claims, 4 Drawing Sheets

METHOD AND DEVICE FOR ESTIMATING A FRICTION COEFFICIENT BETWEEN A TIRE AND A ROAD SURFACE

FIELD OF THE INVENTION

The present invention relates to a method and device for estimating a friction coefficient between a tire and a road surface, and more particularly, to a method and a device for estimating a friction coefficient between a tire and a road surface that may be used in obtaining a safety distance for an adaptive vehicle.

BACKGROUND OF THE INVENTION

In general, a running vehicle has to maintain a predetermined separation from a vehicle ahead thereof as a provision against an emergency situation such as an abrupt stop of the preceding vehicle. For this reason, recent vehicles are equipped with a system calculating a proper safety distance with respect to the preceding vehicle and a system for maintaining the calculated safety distance between the two vehicles.

In a prior art longitudinal vehicle motion control system, the safety distance between the vehicles has been calculated by means of the following Equation 1:

[Equation 1]

safety distance between vehicles=speed of a vehicle being controlled X headway time The resulting safety distance found by such equation is a value obtained without taking into consideration the characteristics of the road surface on which the vehicle runs. Accordingly, the same safety distance is applied to the vehicle regardless of factors of an environment surrounding the vehicle, e.g., conditions of the road surface. In other words, the safety distance applied to a vehicle running on a road surface under normal conditions is identical to that applied to a vehicle on a slippery road covered with snow. This leads to an increase of the possibility of an accident to the latter vehicle, i.e., the vehicle running on the slippery road.

SUMMARY OF THE INVENTION

The present invention provides a method and a device for estimating a friction coefficient between a tire and a road surface that may be used in obtaining a safety distance for an adaptive vehicle, by only using RPM sensors normally equipped on vehicles. According to a preferred embodiment of the present invention, a method for estimating a friction coefficient between a tire of a vehicle and a road surface comprises (a) obtaining state variable data representing conditions of the vehicle by using RPM sensors equipped on the vehicle; (b) correcting part of the state variable data including noise by means of a Kalman Filter; (c) obtaining a turbine torque by means of mathematical modeling having the state variable data as input data; (d) estimating a driving torque based on the turbine torque and the state variable data; (e) calculating a slip ratio based on the state variable data; and (f) estimating the friction coefficient based on the state variable data, the slip ratio, and the driving torque as input data. The state variable data include an angular velocity of an engine, an angular velocity of a transmission carrier, an angular velocity of a front wheel, and an angular velocity of a rear wheel.

In accordance with another aspect of the present invention, there is provided a device for estimating a friction coefficient between a tire of a vehicle and a road surface. In a preferred embodiment, a state variable input section obtains state variable data representing conditions of the vehicle by using RPM sensors equipped on the vehicle. A friction coefficient estimator estimates the friction coefficient by using the state variable data. A friction coefficient value storage or memory stores the estimated friction coefficient. A braking/steering monitoring section monitors the braking action and steering action of the vehicle and generates signals when either of the braking action or the steering action are applied. Further, a control section receives the signals from the braking/steering monitoring section and outputs the friction coefficient stored in the friction coefficient value storage when both or either of the braking action and the steering action are applied. The control section also outputs the friction coefficient estimated by the friction coefficient estimator when the braking action and the steering action are not applied to the vehicle.

Preferably, the friction coefficient estimator includes a Kalman Filter for correcting part of the state variable data including noise. A torque converter modeling section is also included to obtain a turbine torque by means of mathematical modeling based on the state variable data as input data. A drive shaft torque calculator estimates a driving torque based on the turbine torque and the state variable data. A slip ratio calculator calculates a slip ratio based on the state variable data, and a friction coefficient calculator calculates the friction coefficient based on the state variable data, the slip ratio and the driving torque as input data.

In a further preferred embodiment, a method for estimating a friction coefficient between a tire of a vehicle and a road surface comprises generating at least one vehicle state variable data signal representative of the vehicle operational state; selectively filtering noise from said at least one data signal; mathematically modeling turbine torque based on said at least one data signal; estimating driving torque based on said modeled turbine torque and said at least one data signal; calculating a vehicle slip ratio based on said at least one data signal; and estimating the friction coefficient based on said slip ratio, driving torque and at least one data signal. Preferably, the at least one data signal contains information representative of revolution speed of selected vehicle components, including signals representative of engine angular velocity, transmission carrier angular velocity, front wheel angular velocity and rear wheel angular velocity. Also preferably, the selectively filtering comprises Kalman filtering the transmission carrier angular velocity and front and rear wheel angular velocity signals.

According to yet another aspect of the invention, an apparatus for estimating and outputting a friction coefficient between a tire of a vehicle and a road surface for use in safety distance calculations in an adaptive vehicle is provided. In a preferred embodiment, the apparatus comprises at least one processor communicating with plural vehicle sensors to receive signals representative of the vehicle operational state. The processor is preferably programmed to execute a number of functions, including to mathematically model turbine torque based the data signals; estimate driving torque based on the modeled turbine torque and selected data signals; calculate a vehicle slip ratio based on selected data signals; and estimate the friction coefficient based on the slip ratio, driving torque and data signals. In a preferred embodiment, the data signals comprise at least signals representative of engine angular velocity, transmission carrier angular velocity, front wheel angular velocity and rear wheel angular velocity. Preferably the at least one processor is programmed to Kalman filter the transmission carrier angular velocity and front and rear wheel angular velocity signals.

In a further preferred embodiment, the estimated friction coefficient is stored in a memory for later output. The data signals preferably comprise signals representative of applied braking functions and steering control functions and the at least one processor is further programmed to output the stored friction coefficient when one or both of the braking and steering functions are employed, and to estimate a new friction coefficient when no braking or steering functions are employed. Thus, the at least one processor may be further programmed to calculate an effective safety distance in part on the output friction coefficient.

BRIEF DESCRIPTION OF THE DRAWINGS

The accompanying drawings, which are incorporated in and constitute a part of the specification, illustrate embodiments of the invention, and, together with the description, serve to explain the principles of the invention, where.

DETAILED DESCRIPTION OF THE PREFERRED EMBODIMENTS

Hereunder, a preferred embodiment of the inventive friction coefficient estimation method and device for estimating a friction coefficient between a tire and a road surface will be described in detail with reference to the accompanying drawings. It should be understood that the super-script "^" (a hat symbol) means an estimated value, whereas the super-script "·" (a dot symbol) means a change rate.

Figure 1:
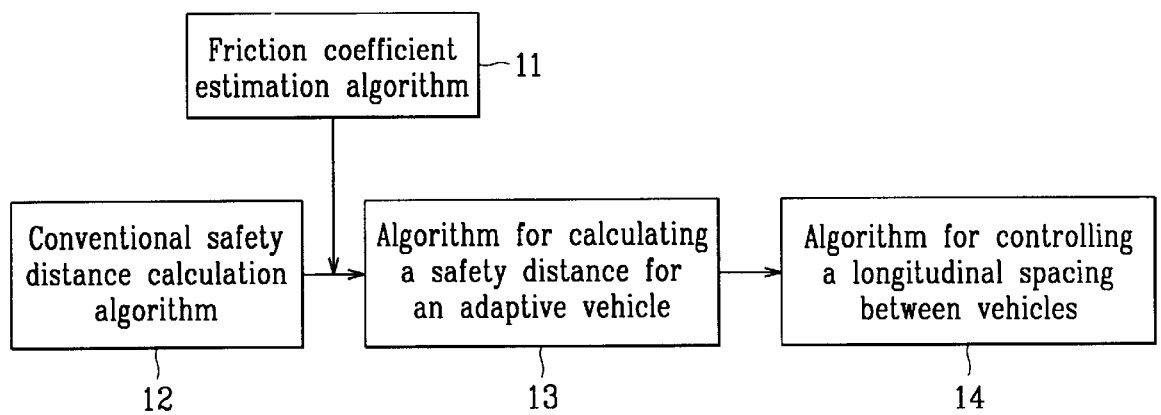
FIG. 1 is a block diagram schematically illustrating the present invention.

FIG. 1 schematically illustrates an embodiment of the present invention. First, a plurality of state variables necessary to estimate the friction coefficient are measured using RPM sensors equipped on the vehicle. Preferably only the RPM sensors are used. These state variables are used to estimate the friction coefficient by means of a friction coefficient estimation algorithm 11, and the estimated friction coefficient is applied to a conventional safety distance calculation algorithm 12 for calculating a safety distance between the vehicles. With the safety distance value obtained from the conventional algorithm 12, safety distances applicable to adaptive vehicles can be calculated by using an algorithm 13 for calculating a safety distance for the adaptive vehicle. The values of the safety distance for the adaptive vehicle can be used in controlling a longitudinal spacing between the vehicles via algorithm 14.

Figure 2:
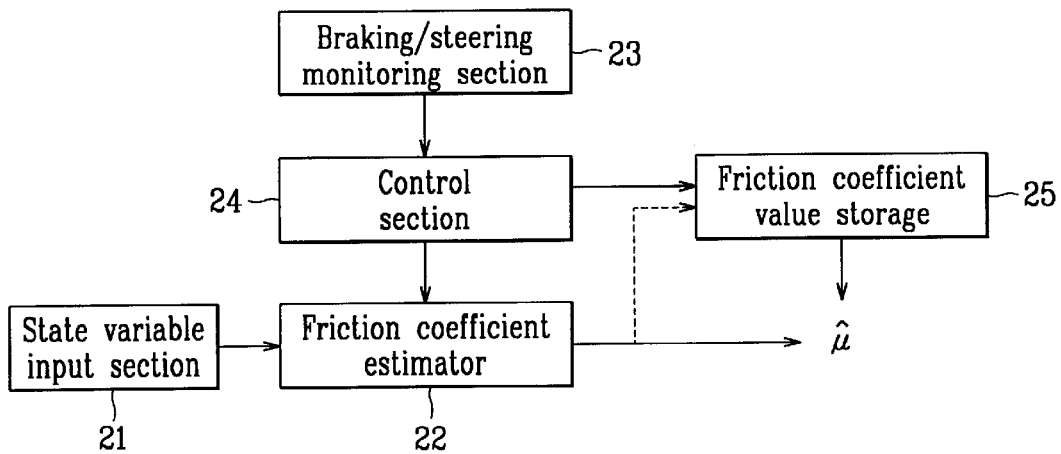
FIG. 2 is a block diagram schematically showing a friction coefficient estimation device using a friction coefficient estimation method according to the present invention.

As shown in FIG. 2, friction coefficient estimation device 20 preferably includes a state variable input section 21, a friction coefficient estimator 22, a braking/steering monitoring section 23, a control section 24, and a friction coefficient value storage 25. Using the friction coefficient estimation device 20 constructed in this manner enables not only an exact estimation of the friction coefficient in a case where no braking or steering action is applied to the vehicle, but it also prevents an incorrect estimation of the friction coefficient due to the state variables varying sharply in the case of either a braking action or a steering action occurring.

A detailed description of components and operations of the friction coefficient estimation device 20 will be made with reference to FIGS. 3 and 7. In a preferred embodiment, the device according to the present invention, including friction coefficient estimation device 20, may be executed by a vehicle on board computer such as one or more appropriately programmed processors, microchips or other computing means, including associated memory. Persons skilled in the art may implement appropriate programming based on the teachings herein.

Figure 3:
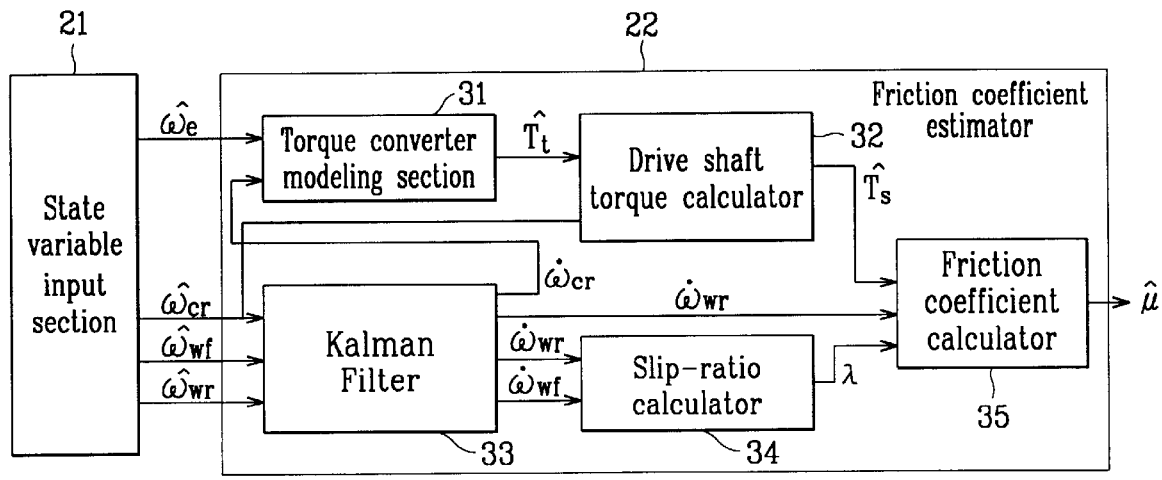
FIG. 3 is a block diagram schematically illustrating a state variable input section and a friction coefficient estimator of the inventive friction coefficient estimation device according to the present invention.

FIG. 3 illustrates the state variable input section 21 and the friction coefficient estimator 22. The friction coefficient estimator 22 cooperates with the state variable input section 21, and it includes a torque converter modeling section 31, a drive shaft torque calculator 32, a Kalman Filter 33, a slip ratio calculator 34, and a friction coefficient calculator 35.

The state variable input section 21 obtains state variables, preferably by only using RPM sensors equipped on the vehicle, which include an angular velocity of an engine $\omega e$, an angular velocity of a transmission carrier $\omega cr$, an angular velocity of a front wheel $\omega wf$, and an angular velocity of a rear wheel $\omega wr$. These state variables are input to the friction coefficient estimator 22.

As shown in FIG. 3, in the torque converter modeling section 31, the engine angular velocity $\omega e$ and an estimated angular velocity of the transmission carrier $\hat{\omega}_{cr}$ filtered via the Kalman Filter 33 are input thereto as input data, and a turbine torque Tt is calculated by using a map in the modeling section. The calculated turbine torque Tt is output to the drive shaft torque calculator 32.

The drive shaft torque calculator 32 calculates an estimated driving torque $\hat{T}_s$ by using the turbine torque Tt and the transmission carrier angular velocity $\omega cr$, according to Equation 2, and the estimated driving torque Ts is sent to the friction coefficient calculator 35.

$$\dot{\hat{\omega}}_{cr} = \frac{1}{I_{cr,i}}\left(\frac{T_t}{R_{gi}} - R_d T_s\right), \quad \dot{\hat{T}}_s = K_s(R_d \omega_{cr} - \omega_{wr}) \qquad \text{[Equation 2]}$$

The two equations of Equation 2 respectively denote a state equation of the transmission carrier angular velocity $\omega cr$ and a state equation of the driving torque Ts. Ks and Icr,i respectively denote a shaft stiffness coefficient and an inertial moment of the transmission carrier. Tt, Rgi, and Rd respectively denote the turbine torque, a gear ratio, and a final reduction gear ratio.

An error rate of the drive shaft torque calculator 32 can be controlled on the basis of the following Equations 3 and 4.

Equation 3 can be obtained by transforming Equation 2 described above, provided that $\omega cr = x1$, $Ts = x2$, $y1 = x1 + n1$, and $y2 = \omega wr + n2$, wherein n1 and n2 represent white noise.

$$\dot{\hat{x}}_1 = -\frac{R_d}{I_{cr,i}}\hat{x}_2 + \frac{1}{I_{cr,i}R_{gi}}T_t + L_1(y_1 - \hat{y}_1) \qquad \text{[Equation 3]}$$

-continued $$\dot{x}_2 = K_s R_d \hat{x}_1 - K_s y_2 + L_2(y_1 - \hat{y}_1)$$

On the other hand, L1 and L2 of Equation 3 represent gains of a linear estimator, and these can be determined by allowing error rates e1 and e2 used in the following Equation 4 to be converged to zero.

[Equation 4]

$$\dot{e}_1 = -\frac{R_d}{I_{cr,i}} - L_1(e_1 + n_1)$$

$$\dot{e}_2 = K_s R_d e_1 + K_s n_2 - L_2(e_1 + n_1)$$

$$\begin{bmatrix} \dot{e}_1 \\ \dot{e}_2 \end{bmatrix} = \begin{bmatrix} -L_1 & -\frac{R_d}{I_{cr,i}} \\ K_s R_d - L_2 & 0 \end{bmatrix} \begin{bmatrix} e_1 \\ e_2 \end{bmatrix} + \begin{bmatrix} -L_1 & 0 \\ -L_2 & K_s \end{bmatrix} \begin{bmatrix} n_1 \\ n_2 \end{bmatrix},$$

$$\dot{e} = Ae + Bn$$

The drive shaft torque calculator 32 calculates the estimated driving torque $\hat{T}_s$ by means of Equation 2, and sends the estimated data to the friction coefficient calculator 35. In this process, in order to minimize the error rate of the drive shaft torque calculator, Equations 3 and 4 can be used.

Since the transmission carrier angular velocity $\omega_{cr}$, the front wheel angular velocity $\omega_{wf}$, and the rear wheel angular velocity $\omega_{wr}$ as obtained from the state variable input section 21 have noise, these data are filtered by the Kalman Filter 33. The filtered angular velocity $\hat{\omega}_{cr}$ of the transmission carrier is sent to the torque converter modeling section 31, and the filtered angular velocity $\hat{\omega}_{wf}$ of the front wheel and the filtered angular velocity $\hat{\omega}_{wr}$ of the rear wheel are sent to the slip ratio calculator 34. Further, a change rate $\dot{\hat{\omega}}_{wr}$ of the filtered angular velocity $\hat{\omega}_{wr}$ of the rear wheel is calculated to be input to the friction coefficient calculator 35.

The slip ratio calculator 34 receives the filtered angular velocities $\hat{\omega}_{wf}$ and $\hat{\omega}_{wr}$ of the front wheel and the rear wheel as input data to calculate a slip ratio $\lambda$, and sends the slip ratio $\lambda$ to the friction coefficient calculator 35.

The slip ratio $\lambda$ is calculated based on the following equation:

$$\lambda = 1 - v/\gamma \omega_{wr}$$

wherein, provided that no slip occurs, $v = \gamma \omega_{wr}$.

The friction coefficient calculator 35 receives the estimated driving torque $\hat{T}_s$ sent from the drive shaft torque calculator 32, the change rate of $\dot{\hat{\omega}}_{wr}$ of the filtered angular velocity of the transmission carrier sent from the Kalman Filter 33, and the slip ratio $\lambda$ of the slip ratio calculator 34 sent from the slip ratio calculator 34, and calculates a slope $K\lambda$ of a tractive force with respect to the slip ratio. Next, the friction coefficient calculator 35 obtains the estimated friction coefficient $\mu$ from the slope $K\lambda$ of the tractive force with respect to the slip ratio according to processes to be described below.

In a region of a small slip ratio, a relationship between the tractive force and the slip ratio $\lambda$ appears as a linear shape, and the friction coefficient between the road surface and the tire can be estimated from the slope of that linear shape, namely, the slope $K\lambda$ of the tractive force with respect to the slip ratio.

Figure 4:
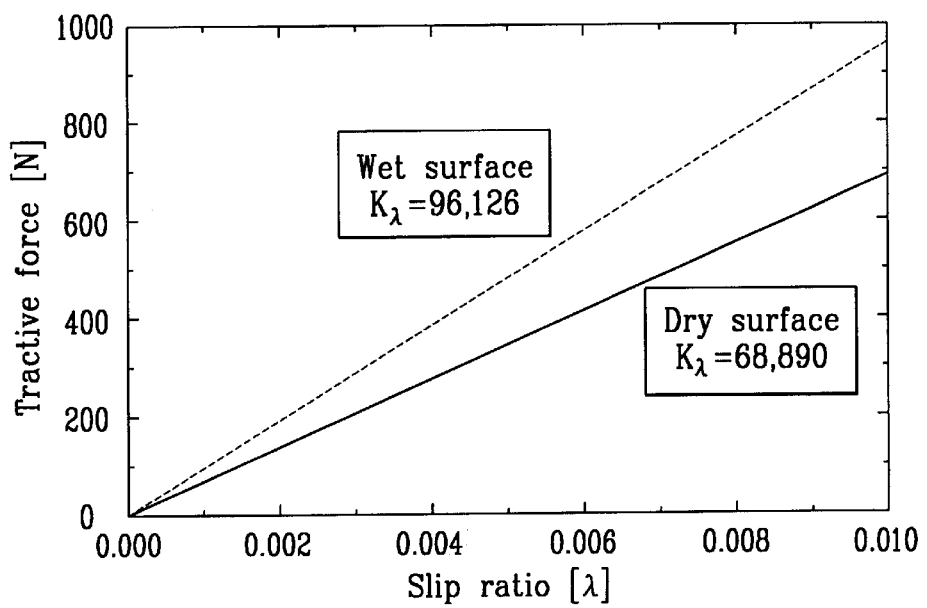
FIG. 4 is a graph illustrating a relationship between a tractive force and a slip ratio.

FIG. 4 shows a graph obtained through a test of real vehicles, showing the slopes $K\lambda$ of the tractive force with respect to the slip ratio in cases of a wet surface and a dry surface of a road made of concrete, wherein a dotted line represents the slope $K\lambda$ in the case of a wet surface of the concrete road, while a solid line indicating the slope $K\lambda$ in the case of a dry surface of the concrete road. When the slope s of the slip is defined as $K\lambda/Fz$ (wherein Fz represents generally a normal tire force of about 492 kg, namely, 4826.52N), the slope $K\lambda$ in the case of the wet road surface is 19.916, while the slope $K\lambda$ in the case of the dry road surface is 14.273. The slope s of the slip is estimated by Equation 5 using the method of least squares.

[Equation 5]

$$y(k+1) = \theta(k)\phi(k)^T$$

wherein $$y(k) = T_s - I_{wr}\dot{\omega}_{wr} - T_{rollr}, \phi(k) = r_\gamma \lambda \cdot F_z, \theta(k) = \hat{s}.$$

It is known that a friction coefficient $\mu p$ of a dry surface of a concrete road and a friction coefficient $\mu p$ of a wet surface thereof are normally about 0.9 and 0.8, respectively. A friction coefficient $\mu p$ of a snow-covered road is about 0.2, provided that the friction coefficient $\mu p$ is defined as Fx/Fz and that Fx represents the tractive force. In a range such that the slip ratio is equal to or lower than 0.01, the slope s of the slip in the case of a wet surface has a higher value than that in the case of a dry surface, whereas the friction coefficient $\mu p$ in the case of a wet surface is smaller than that in the case of a dry surface.

Figure 5:
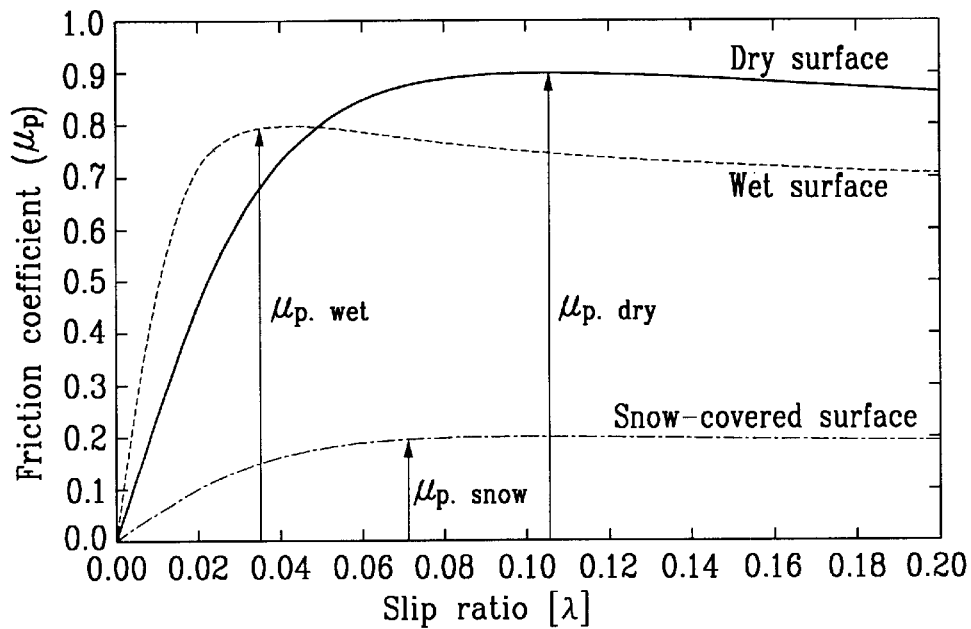
FIG. 5 is a graph of values of a friction coefficient with respect to a slip ratio.

FIG. 5 shows a graph of friction coefficients according to such states of road surfaces. As shown in FIG. 5, the friction coefficients reduce in the order of dry surface, wet surface, and snow-covered surface. As the slip ratios increase, such friction coefficients gradually become relatively constant, but the value of the friction coefficients vary substantially when the slip ratio is small. For this reason, it is required to estimate the friction coefficient depending upon the estimated slope of the slip.

Figure 6:
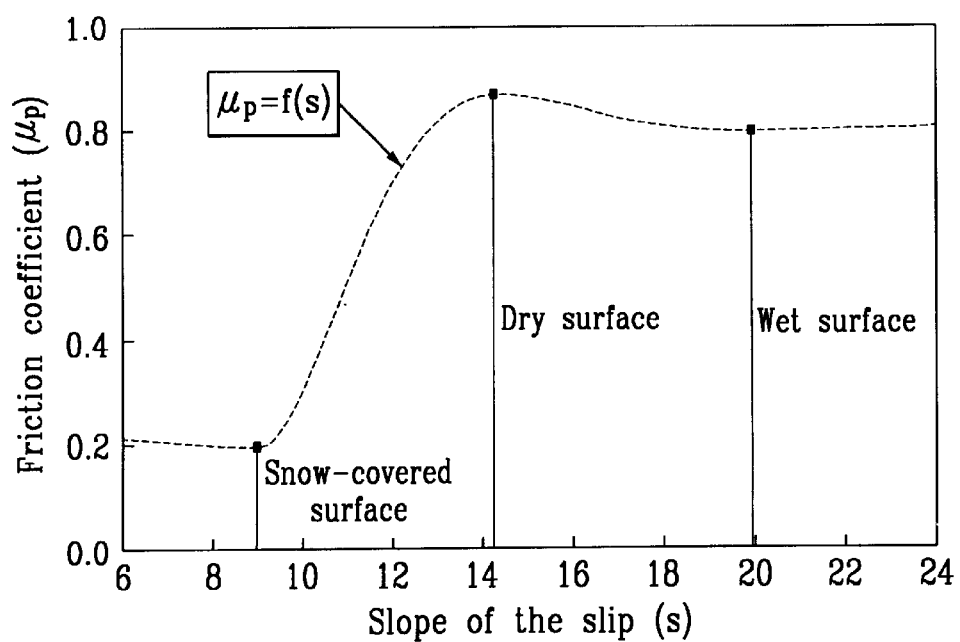
FIG. 6 is an estimated friction coefficient curve obtained by a function of an estimated slope of the slip.

There are various methods defining the friction coefficient dependent on the slope of the slip, which can normally be represented by $\mu_p = f(s)$. FIG. 6 shows a curve of the function $f(s)$ that can be used in obtaining the friction coefficient depending on the slope of the slip. The estimated friction coefficient obtained by the friction coefficient calculator 35 of the friction coefficient estimator 22 described above can be calculated by a function such as this.

The following Equation 6 can be used to calculate a safety distance for the adaptive vehicle that is more properly adjusted according to the environment surrounding the vehicle by using the estimated friction coefficient described above.

[Equation 6]

safety distance for the adaptive vehicle=$f(\mu)$ X safety distance for the normal vehicle As shown in Equation 6, the safety distance for the adaptive vehicle can be calculated by means of the influence caused by the friction coefficient and the safety distance applied to the conventional non-adaptive vehicle. Meanwhile, the function $f(\mu)$ contained in Equation 6 can be obtained by the following Equation 7.

[Equation 7]

$$f(\mu) = \begin{cases} f(\mu_{\min}) + \end{cases}$$

-continued $$\begin{cases} f(\mu_{min}) & \text{if } \mu \leq \mu_{min} \\ \dfrac{f(\mu_{norm}) - f(\mu_{min})}{\mu_{norm} - \mu_{min}}(\mu - \mu_{min}) & \text{if } \mu_{min} < \mu < \mu_{norm} \\ f_{norm} & \text{if } \mu \geq \mu_{norm} \end{cases}$$

wherein $\mu_{norm}$ represents a friction coefficient of a normal road surface, while $\mu_{min}$ indicates a minimum friction coefficient.

In Equation 7, $f(\mu)$ is a function for a friction adjustment and appears in a linear shape. When the calculated safety distance for the adaptive vehicle is used in controlling the longitudinal spacing of the vehicles, different safety distances are applied between when the vehicle runs on a normal road surface and when the vehicle runs on a road surface having a lower friction coefficient due to snow, rain, etc. That is, the safety distance for the vehicle running on a slippery road surface is compensated by the function for the friction adjustment. As a result, it becomes a value larger than that for the vehicle running on the road surface of the normal condition.

Figure 7:
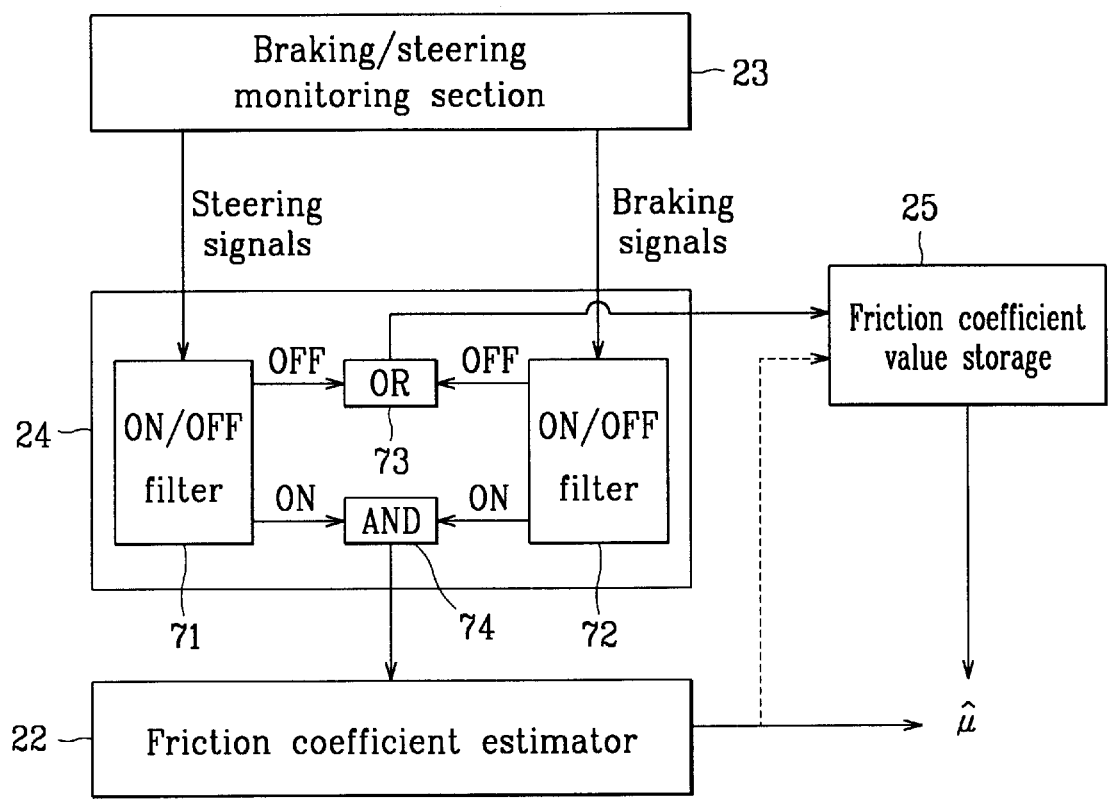
FIG. 7 is a block diagram schematically illustrating a control section when a braking action or a steering action occurs according to the invention.

FIG. 7 illustrates the friction coefficient estimation device shown in FIG. 2, when a braking action or a steering action occurs. Since there is a possibility for the state variables to vary sharply, when the braking action or the steering action occurs, it is required to stop the calculation through the friction coefficient estimation algorithm and to maintain the estimated friction coefficient obtained in the preceding calculation during braking or steering.

When braking action or steering action occurs, the braking/steering monitoring section 23 sends a braking signal or a steering signal informing of the braking or the steering to the control section 24. ON/OFF filters 71 and 72 of the control section 24 work in response to these signals. The ON/OFF filter 71 receives the steering signal from the braking/steering monitoring section 23, whereas the ON/OFF filter 72 receives the braking signal from the braking/steering monitoring section 23. The ON/OFF filters 71 and 72 receiving the braking signals and the steering signals send ON signals when the braking action and the steering action are not applied and OFF signals when the braking action and the steering are applied, to an OR gate 73 or an AND gate 74.

The ON/OFF filters 71 and 72 send the ON signals to the AND gate 74 when the braking action and the steering action are not applied, and the friction coefficient estimator 22 receiving signals from the AND gate 74 estimates the friction coefficient of the road surface depending on the state variables input thereto as input data and outputs the estimate. However, both or either of the ON/OFF filters 71 and 72 output the OFF signals when the braking action and the steering action are applied, and the friction coefficient stored in the fiction coefficient value storage 25 is used. As indicated with a dotted line in FIG. 7, the friction coefficient estimator 22 repeatedly stores the calculated friction coefficient $\mu$ in the friction coefficient value storage 25 for use during the braking or the steering. Accordingly, when the braking action and the steering action are applied, the friction coefficient stored in the friction coefficient value storage 25 is used to calculate the safety distance for the adaptive vehicle.

That is, since both or either of the ON/OFF filters 71 and 72 output the OFF signals when the braking action and the steering action are applied, the AND gate 74 does not send signals to the friction coefficient estimator 22, so the friction coefficient estimator 22 does not estimate the friction coefficient and the estimated friction coefficient obtained in the preceding process is used for a calculation.

If the friction coefficient obtained through the inventive method for estimating the friction coefficient between the tire and the road surface is applied to a calculation of the safety distance for the adaptive vehicle, different safety distances result between when the vehicle runs on a normal road surface and when the vehicle runs on a road surface having a lower friction coefficient due to snow, rain, etc., thereby enabling more effective control of the longitudinal spacing between vehicles. Further, since in a preferred embodiment the method uses only the RPM sensors equipped on the vehicle, not necessitating separate expensive sensors, it can be embodied with reduced costs. Further, the inventive friction coefficient estimation device may prevent the use of the incorrect friction coefficient, which may be calculated by using state variables that vary sharply, during braking and steering.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for estimating a friction coefficient between a tire of a vehicle and a road surface comprising:

(a) obtaining state variable data representing conditions of the vehicle by using RPM sensors equipped on the vehicle;

(b) correcting part of the state variable data including noise by means of a Kalman Filter;

(c) obtaining a turbine torque based on mathematical modeling having the state variable data as input data;

(d) estimating a driving torque based on the turbine torque and the state variable data;

(e) calculating a slip ratio based on the state variable data; and (f) estimating the friction coefficient based on the state variable data, the slip ratio, and the driving torque as input data.

2. The method of claim 1, wherein the state variable data include an angular velocity of an engine, an angular velocity of a transmission carrier, an angular velocity of a front wheel, and an angular velocity of a rear wheel.

3. The method of claim 1, wherein the step (d) estimates the driving torque according to the following equations:

$$\dot{\omega}_{cr} = \frac{1}{I_{cr,i}}\left(\frac{T_t}{R_{gi}} - R_d T_s\right), \quad T_s = K_s(R_d \omega_{cr} - \omega_{wr})$$

wherein $\omega_{cr}$ and Ts respectively denote a carrier angular velocity and the driving torque, Ks and Icr,i respectively denote a shaft stiffness coefficient and an inertial moment of the transmission carrier, and Tt, Rgi, and Rd respectively denote the turbine torque, a gear ratio, and a final reduction gear ratio.

4. The method of claim 3, wherein in the equation for estimating the driving torque, an error rate is calculated according to the following equations:

$$\dot{\hat{x}}_1 = -\frac{R_d}{I_{cr,i}}\hat{x}_2 + \frac{1}{I_{cr,i}R_{gi}}T_t + L_1(y_1 - \hat{y}_1)$$

-continued $$\dot{\hat{x}}_2 = K_s R_d \hat{x}_1 - K_s y_2 + L_2(y_1 - \hat{y}_1)$$

wherein $\omega cr = x1$, $Ts = x2$, $y1 = x1 + n1$, and $y2 = \omega wr + n2$, and L1 and L2 of the equations denote gains and are determined by allowing error rates e1 and e2 used in the following equations to be converged to zero:

$$\dot{e}_1 = -\frac{R_d}{I_{cr,i}} - L_1(e_1 + n_1)$$

$$\dot{e}_2 = K_s R_d e_1 + K_s n_2 - L_2(e_1 + n_1)$$

$$\begin{bmatrix} \dot{e}_1 \\ \dot{e}_2 \end{bmatrix} = \begin{bmatrix} -L_1 & -\frac{R_d}{I_{cr,i}} \\ K_s R_d - L_2 & 0 \end{bmatrix} \begin{bmatrix} e_1 \\ e_2 \end{bmatrix} + \begin{bmatrix} -L_1 & 0 \\ -L_2 & K_s \end{bmatrix} \begin{bmatrix} n_1 \\ n_2 \end{bmatrix}, \dot{e} = Ae + Bn.$$

5. The method of claim 3, wherein the step (f) estimates a slope of the slip according to the following equations:

$$y(k+1) = \theta(k)\phi(k)^T$$

$$y(k) = T_s - I_{wr}\dot{\omega}_{wr} - T_{rollr}, \phi(k) = r_y\lambda \cdot F_z, \theta(k) = \hat{s}$$

and the friction coefficient is estimated by using a function dependent on the estimated slope of the slip.

6. A device for estimating a friction coefficient between a tire of a vehicle and a road surface, comprising:
a state variable input section for obtaining state variable data representing conditions of the vehicle by using RPM sensors equipped on the vehicle;
a friction coefficient estimator for estimating the friction coefficient by using the state variable data;
a friction coefficient value storage keeping therein the estimated friction coefficient;
a braking/steering monitoring section for monitoring a braking action and a steering action of the vehicle and generating signals when either of the braking action and the steering action are applied to the vehicle; and
a control section receiving the signals from the braking/steering monitoring section and outputting the friction coefficient stored in the friction coefficient value storage when both or either of the braking action and the steering action are applied to the vehicle, and outputting the friction coefficient estimated by the friction coefficient estimator when the braking action and the steering action are not applied to the vehicle.

7. The device of claim 6, wherein the state variable data include an angular velocity of an engine, an angular velocity of a transmission carrier, an angular velocity of a front wheel, and an angular velocity of a rear wheel.

8. The device of claim 6, wherein the friction coefficient estimator includes:
a Kalman Filter for correcting part of the state variable data including noise;
a torque converter modeling section for obtaining a turbine torque by means of mathematical modeling having the state variable data as input data;
a drive shaft torque calculator for estimating a driving torque by means of the turbine torque and the state variable data;
a slip ratio calculator for calculating a slip ratio by using the state variable data; and
a friction coefficient calculator for calculating the friction coefficient by receiving the state variable data, the slip ratio, and the driving torque as input data.

9. The device of claim 8, wherein the drive shaft torque calculator calculates the driving torque according to the following equations:

$$\dot{\omega}_{cr} = \frac{1}{I_{cr,i}}\left(\frac{T_t}{R_{gi}} - R_d T_s\right), \dot{T}_s = K_s(R_d\omega_{cr} - \omega_{wr})$$

wherein $\omega cr$ and $Ts$ respectively denote a carrier angular velocity and a driving torque, Ks and Icr,i respectively denote a shaft stiffness coefficient and an inertial moment of a transmission carrier, and Tt, Rgi, and Rd respectively denote the turbine torque, a gear ratio, and a final reduction gear ratio.

10. The device of claim 9, wherein in the equation for estimating the driving torque, an error rate is calculated according to the following equations:

$$\dot{\hat{x}}_1 = -\frac{R_d}{I_{cr,i}}\hat{x}_2 + \frac{1}{I_{cr,i}R_{gi}}T_t + L_1(y_1 - \hat{y}_1)$$

$$\dot{\hat{x}}_2 = K_s R_d \hat{x}_1 - K_s y_2 + L_2(y_1 - \hat{y}_1)$$

wherein $\omega cr = x1$, $Ts = x2$, $y1 = x1 + n1$, and $y2 = \omega wr + n2$, and L1 and L2 of the equations denote gains and are determined by allowing error rates e1 and e2 used in the following equations to be converged to zero:

$$\dot{e}_1 = -\frac{R_d}{I_{cr,i}} - L_1(e_1 + n_1)$$

$$\dot{e}_2 = K_s R_d e_1 + K_s n_2 - L_2(e_1 + n_1)$$

$$\begin{bmatrix} \dot{e}_1 \\ \dot{e}_2 \end{bmatrix} = \begin{bmatrix} -L_1 & -\frac{R_d}{I_{cr,i}} \\ K_s R_d - L_2 & 0 \end{bmatrix} \begin{bmatrix} e_1 \\ e_2 \end{bmatrix} + \begin{bmatrix} -L_1 & 0 \\ -L_2 & K_s \end{bmatrix} \begin{bmatrix} n_1 \\ n_2 \end{bmatrix}, \dot{e} = Ae + Bn.$$

11. The device of claim 8, wherein the friction coefficient calculator estimates the slope of the slip according to the following equations:

$$y(k+1) = \theta(k)\phi(k)^T$$

$$y(k) = T_s - I_{wr}\dot{\omega}_{wr} - T_{rollr}, \phi(k) = r_y\lambda \cdot F_z, \theta(k) = \hat{s}$$

and the friction coefficient is estimated by using a function dependent on the estimated slope of the slip.

12. A method for estimating a friction coefficient between a tire of a vehicle and a road surface, comprising:
generating at least one vehicle state variable data signal representative of the vehicle operational state;
selectively filtering noise from said at least one data signal;
mathematically modeling turbine torque based on said at least one data signal;
estimating driving torque based on said modeled turbine torque and said at least one data signal;
calculating a vehicle slip ratio based on said at least one data signal; and
estimating the friction coefficient based on said slip ratio, driving torque and at least one data signal.

13. The method according to claim 12, wherein said at least one data signal contains information representative of revolution speed of selected vehicle components.

14. The method according to claim 13, wherein said at least one data signal comprises signals representative of engine angular velocity, transmission carrier angular velocity, front wheel angular velocity and rear wheel angular velocity.

15. The method according to claim 14, wherein said selectively filtering comprises Kalman filtering the transmission carrier angular velocity and front and rear wheel angular velocity signals.

16. An apparatus for estimating and outputting a friction coefficient between a tire of a vehicle and a road surface for use in safety distance calculations in an adaptive vehicle, comprising at least one processor, the processor communicating with plural vehicle sensors to receive signals representative of the vehicle operational state, wherein said processor is programmed to:

mathematically model turbine torque based said data signals;

estimate driving torque based on said modeled turbine torque and selected data signals;

calculate a vehicle slip ratio based on selected data signals; and estimate the friction coefficient based on said slip ratio, driving torque and data signals.

17. The apparatus according to claim 16, wherein:

said data signals comprise at least signals representative of engine angular velocity, transmission carrier angular velocity, front wheel angular velocity and rear wheel angular velocity; and the at least one processor is programmed to Kalman filter the transmission carrier angular velocity and front and rear wheel angular velocity signals.

18. The apparatus according to claim 16, wherein:

the estimated friction coefficient is stored in a memory;

said data signals comprise signals representative of applied braking functions and steering control functions; and the at least one processor is further programmed to output the stored friction coefficient when one or both of the braking and steering functions are employed, and to estimate a new friction coefficient when no braking or steering functions are employed.

19. The apparatus according to claim 18, wherein the at least one processor is further programmed to calculate an effective safety distance in part on the output friction coefficient.

20. A method for estimating a friction coefficient between a vehicle tire and a road surface, comprising:

generating at least one angular velocity data signal representative of an operational state of a vehicle;

selectively filtering noise from said at least one angular velocity data signal;

mathematically modeling turbine torque based on said at least one angular velocity data signal;

estimating driving torque based on said turbine torque and said at least one angular velocity data signal;

calculating a vehicle slip ratio based on said at least one angular velocity data signal; and estimating a friction coefficient based on said slip ratio, said driving torque, and said at least one angular velocity data signal.

21. The method according to claim 20, wherein said at least one data signal contains information representative of revolution speed of selected vehicle components.

22. The method according to claim 20, wherein said at least one angular velocity data signal comprises signals representative of engine angular velocity, transmission carrier angular velocity, front wheel angular velocity, rear wheel angular velocity, and combinations of the aforementioned signals.

* * * * *